Figure 1:
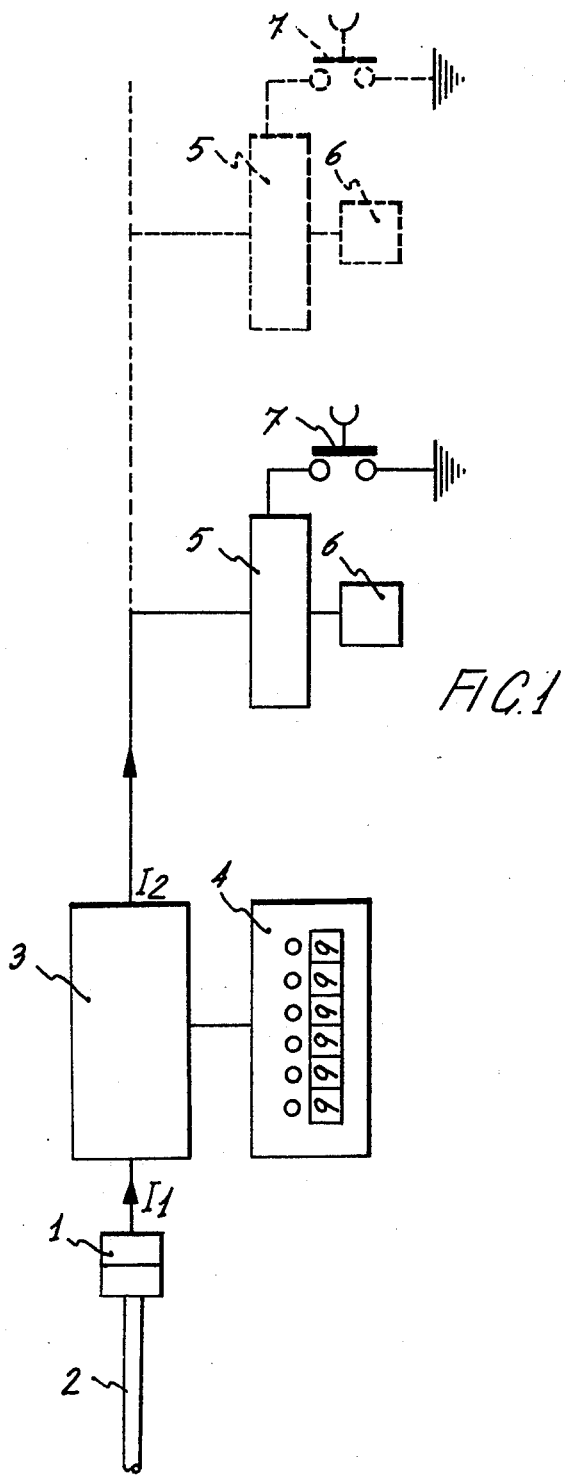

United States Patent [19]

Franzolini et al.

[11] 3,988,879

[45] Nov. 2, 1976

[54] METHOD AND APPARATUS FOR YARN LENGTH MEASURING

[75] Inventors: Luciano Franzolini, Milan; Guido Tarabuso; Claudio Ostrogovich, both of Genoa, all of Italy

[73] Assignee: Nuova San Giorgio S.p.A., Genoa-Sestri, Italy

[22] Filed: July 8, 1974

[21] Appl. No.: 486,674

[52] U.S. Cl. .................................. 57/34 R; 57/78; 57/156; 242/45; 242/39
[51] Int. Cl.² .................. B65H 63/08; B65H 61/00
[58] Field of Search ............... 242/36, 39, 49, 42; 57/34 R, 78, 80, 81, 83; 73/160

[56] References Cited
UNITED STATES PATENTS

| | | | |
|---|---|---|---|
| 3,029,588 | 4/1962 | Davis | 57/78 |
| 3,698,174 | 10/1972 | Boucek | 57/78 X |
| 3,739,996 | 6/1973 | Matsui et al. | 242/39 |
| 3,765,988 | 10/1973 | Shaffer et al. | 242/45 X |

*Primary Examiner*—Donald E. Watkins

[57] ABSTRACT

An apparatus and a method for yarn length measuring according to rotations of a shaft. Rotation of said shaft generates reference pulses which are converted on a manually settable device, into count pulses with a frequency ratio presettable in accordance with the ratio of the yarn length to be measured and a fixed count capability. Counters are provided for each working station of a textile machine which, independently, effecting the count for a same number of count pulses as said counting capability.

19 Claims, 4 Drawing Figures

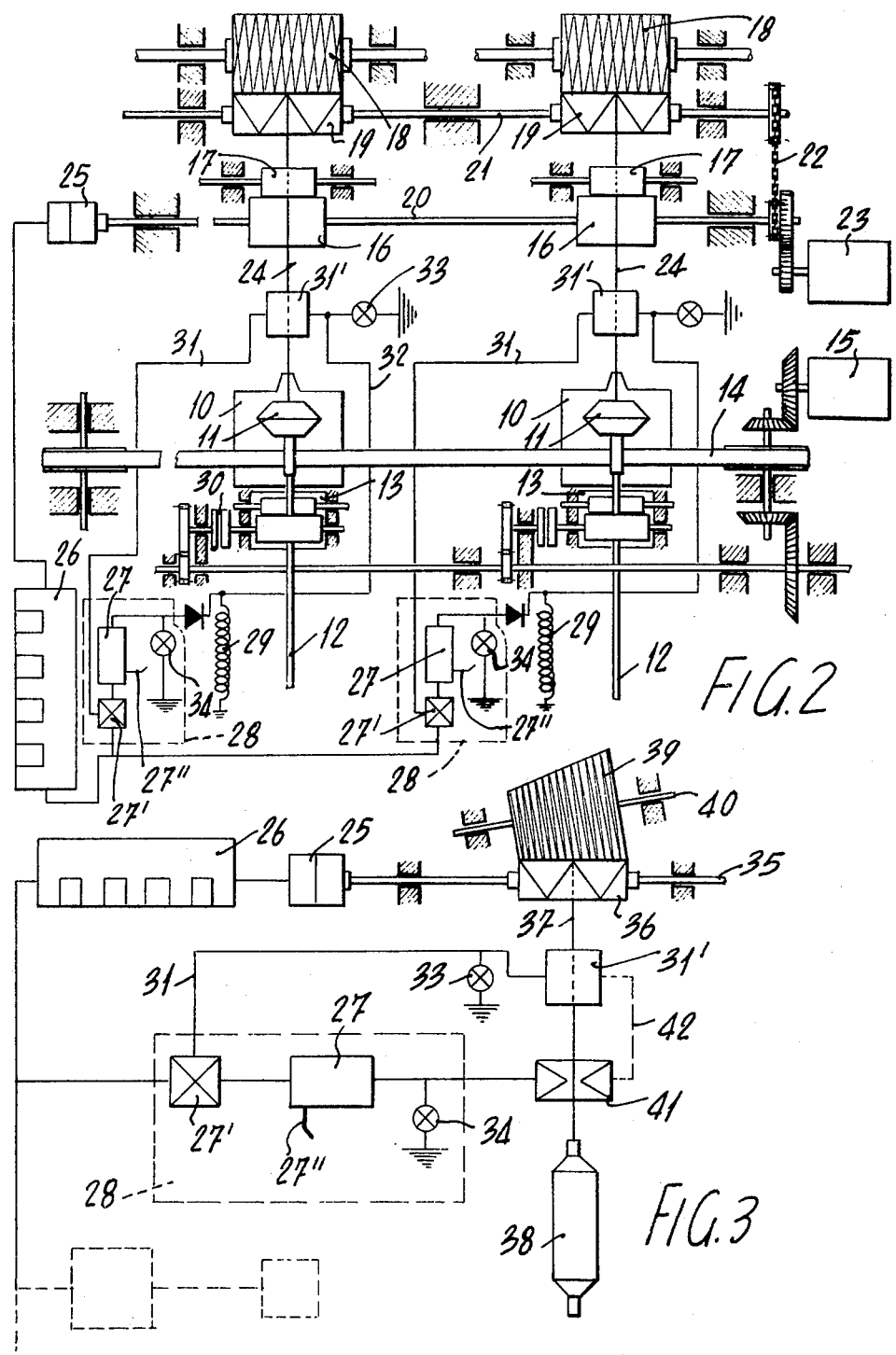

METHOD AND APPARATUS FOR YARN LENGTH MEASURING

This invention relates to a method and apparatus particularly designed for measuring the length of yarns that are wound up on conventional package or bobbins. The invention can be applied to conventional textile machines for yarn processing and production, and is particularly intended for application to "open end" type of ringless spinning machines.

As well known, yarns are frequently doubled or twisted to one another. This operation is carried out on proper textile machines and necessarily requires the provision of bobbins having a same length of yarn wound up thereon in order to avoid undue wastes and at the same time to reduce labor. Also at other processing steps it is convenient to provide bobbins having a same yarn length wound up thereon.

Therefore, following yarn spinning, it is necessary to separately provide for forming yarn bobbins substantially containing a same amount of yarn. Normally, this operation is carried out on winding machines provided with suitable measuring devices for the length of yarn being wound up. Prior art measuring devices are based, for instance, on measuring the weight or diameter of a bobbin and are more somewhat inexact. Thus, the yarn measure in function of the bobbin weight would involve substantial problems in weighing with the required accuracy in connection with the yarn length, as finer and finer yarns are processed. When indirectly measuring in accordance with the bobbin diameter, there may be substantial length differentials between bobbins having more or less closely wound up yarn.

Therefore, it is a primary object of the present invention to provide a method and apparatus for yarn length measuring, enabling an extremely accurate and precise measurement, since the yarn length measuring is effected in accordance with the rotations or turns of a roller or cylinder, the yarn running in contact therewith without slipping, or a drive shaft for said roller or cylinder.

The invention is particularly adapted to be applied to textile machines for yarn processing or production, as fitted with a plurality of working stations or heads driven by a single shaft, such as a single yarn traction cross cylinder or shaft.

Particularly, the invention is adapted to be applied to an open type of ringless spinning machine. Thus, the length measurement for the yarn wound up on bobbins is directly effected on the spinning machine. This latter application is useful and advantageous because of enabling to directly use the bobbins produced on the spinning machine in the subsequent yarn processing steps, comprising yarn doubling or doubling and twisting on double-twist twisting machines.

At present, in order to measure the yarn length on textile machines of the above mentioned design, use is still made of machines or apparatus providing a centralized generation of count pulses being supplied to preset type of count units or counters for the several working stations of the machine.

While providing satisfactory results, the prior art apparatus suffer from a first disadvantage consisting of the high cost of the preset count units to be provided one unit for each of the working stations.

A further disadvantage arises in that, when having to change the measurement for the yarn to be processed and wound up on the bobbins, the presettable rate on each of the count units has to be changed. This disadvantage is particularly significant when taking into account that textile machines are generally provided with many tens of working stations or heads, and therefore the time being required for presetting all of the machine count units will become high and considerably weigh on costs.

Therefore, it is a further object of the invention to provide a simplified method and apparatus for yarn length measuring, affording the use of less expensive elements and enabling to vary the yarn measure capability simultaneously at all of the working stations, by presetting such a measurement on a single centralized unit common to all of the working stations.

Thus, according to the invention a method is proposed for yarn length measuring on textile machines in accordance with the rotations or turns of a shaft which are proportional to the length of the yarn, providing to cyclically generate reference pulses for the rotations or turns of said shaft, converting these reference pulses to count pulses with a presettable frequency ratio in accordance with a ratio of the yarn length to be measured and a fixed count capability, and effecting the count for a same number of count pulses as said capability. At the count end, provision could be made for generating a signal driving a yarn breaking device. As measuring is carried out, should a breakage in the yarn occur due to casual or technological reasons, a yarn sensing device would provide for count stopping at the count unit where the breakage occurred. The yarn breakage repair will restore the sensor enabling again the count unit to proceed in counting from the interruption thereof.

An apparatus according to the invention, suitable to be applied to textile machines for yarn production or processing, of the design having a single drive cylinder or shaft common to the several working stations of the machine, and the rotations or turns of which are related to the amount of yarn to be measured, comprises: a single reference pulse generator for the rotations or turns of said shaft, these reference pulses being supplied and processed by a single central unit provided with a frequency ratio setting device common to all of the machine working stations; in turn, this central unit supplies a series of count pulses of a set ratio, which count pulses are supplied to the peripheral count units having a fixed count capability, for each of the machine working stations which, upon count completion for a predetermined constant number of pulses, will control the yarn interruption at the corresponding working station. Thus, the operation of each working station is rendered independent of that of the other working stations, thereby considerably simplifying the apparatus construction and reducing the cost thereof. In addition to this, by an apparatus according to the invention, use can be made of apparatus or devices previously existing on the textile machines, for example in the case of open end spinning machines, it is possible to operate directly on the fiber supply device of the spinning unit to interrupt the yarn spinning upon count completion.

Figure 4:
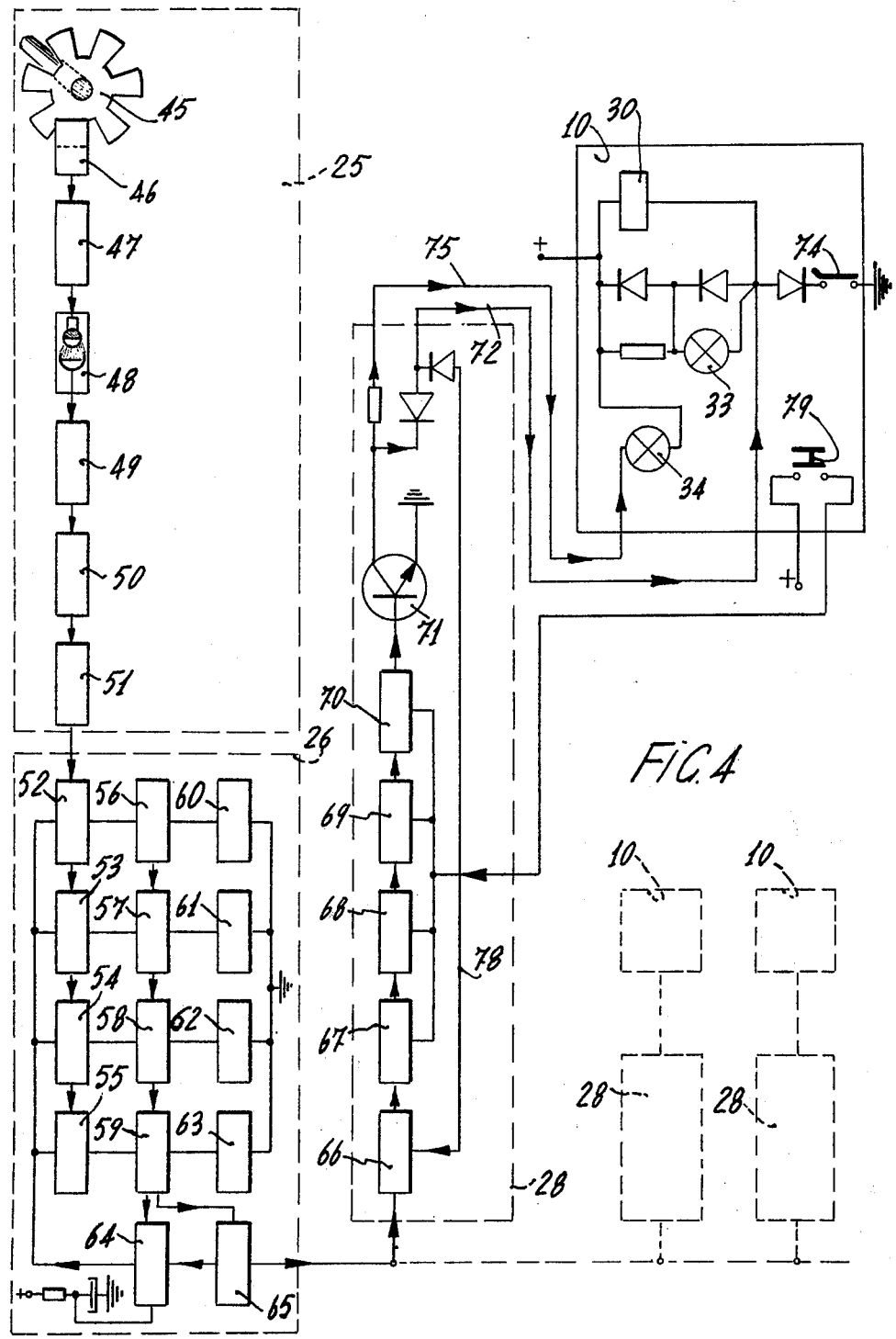

The invention will be now described in greater detail with reference to some not limiting examples shown in the accompanying drawings wherein:

FIG. 1 is a block diagram of the apparatus;

FIG. 2 schematically shows an apparatus according to the invention as applied to an open end type of ringless spinning machine;

FIG. 3 is a view showing an apparatus according to the invention as applied to a yarn winding machine; and FIG. 4 is a detailed block diagram for an embodiment of an electronic apparatus according to the invention.

Referring to FIG. 1, it will be seen that an apparatus for yarn length measuring at one or more working stations on textile machines, such as spinning machines or other machines suitable to change a type of "package" containing yarn or yarns into another of different weight, shape and size, for example to wind up the yarn of a cop on a bobbin, substantially comprises a single transducer or reference pulse generator 1, driven by a shaft 2 common to all of the working of the textile machines, the turns or rotations of this shaft being proportional or correlated to the processed or produced yarn. Said transducer 1 cyclically generates reference pulses $l_1$ of the rotations or turns of said shaft 2, which reference pulses are supplied as input pulses to a centralized processing unit 3 converting the same to count pulses $l_2$ according to a presettable ratio K by a single frequency ratio setting device 4 associated therewith and comprising, for example, a digital change-over switch or other similar component. More particularly, said input pulses $l_1$ to the centralized unit 3 are converted to count pulses $l_2$ with a frequency ratio $\nu_1/\nu_2 = K$, wherein $\nu_1$ is the frequency of the reference pulses $l_1$ and $\nu_2$ is the frequency of the count pulses $l_2$. In other terms, the centralized unit 3 will supply a count pulse $l_2$ after receiving a number of reference pulses $l_1$ equal to said ratio K set on the change-over switch 4.

The count pulses $l_2$ are supplied to the individual count units 5 for each of the working heads or stations on the textile machine. These count units 5 are substantially counters of a fixed counting capability which, upon reaching a predetermined number Q of pulses $l_2$, supply a control signal for a corresponding device 6 operating to interrupt the yarn. These count units 5 can be of any design, such as electronic, electric, mechanical or pneumatic count units and can be reset by operating on a resetting device, such as the pushbutton 7 schematically shown in FIG. 1.

From the foregoing it will be appreciated that the ratio K presettable in the frequency ratio setting device 4 is in turn determined in accordance with the yarn length L to be measured and the number n of reference pulses $l_1$ per yarn length unit relative to the fixed count capability Q common to all the counters 5: $K = (nL/Q)$.

For the sake of simplicity, where $n = 1$, the pulse conversion ratio K will be determined by the ratio of the yarn length L (variable) to be measured and the count capability Q (constant) of the counters 5.

The foregoing will become more apparent from the following example. Suppose it is desired to measure 360,000 m yarn at each working station by counters of 1,000 pulse count capability, with one pulse $l_1$ at the input to the centralized unit 3 for every yarn meter. Under such conditions, the device 4 only needs to be set at a ratio of 360, that is for every 360 input pulses $l_1$, the frequency conversion centralized unit 3 will supply a count pulse $l_2$. It will be seen from the foregoing that by only operating on said frequency ratio setting device 4, it would be possible with a single operation to extremely readily change the capability of measuring the length of yarn produced or processed at each of the working stations of the textile machine.

Referring now to FIG. 2, the apparatus according to the invention will be described as applied to an open end type or ringless spinning machine for directly measuring a yarn being wound up on the bobbins provided by the spinning machine.

As well known, an open end spinning machine generally comprises a plurality of spinning units 10, each of which defining a working station of the machine. Each of the spinning units 10 comprise a rotor or rotating hollow member 11, defining part of a spinning chamber, internally of which open state fibers withdrawn from a fiber sliver or web 12 are supplied in a per se known manner through the agency of a feeding device outlined at 13.

The several rotors 11 for the spinning units are rotably driven by, for example, an endless belt 14 driven by a proper electric motor 15 or the like, and the yarn 24 spun in each of the spinning units 10 is withdrawn for example, by respective withdrawing rollers 16 carried by a single drive shaft 20 common to and cooperating with pressure rollers 17 in a per se known manner. The yarn withdrawn from the spinning unit by the rollers 16 is fed and wound up on bobbins 18, such as by a respective collecting and distributing cylinder 19, or other equivalent means. As it will be seen, the withdrawing rollers 16 are carried by the common shaft 20 rotably supported transversely of the textile machine, and similarly the winding rollers 19 are carried by a common drive shaft 21. Said shafts 20 and 21 are mechanically interconnected by a drive 22 and one of said shafts is rotably driven, for example through an electric motor 23 or the like.

From the foregoing, it will be seen that the yarn 24 being withdrawn at a constant rate from each of the spinning units 10, contacts the outer surface of the withdrawing rollers 16, so that the measure of the yarn winding up on each of the bobbins 18 can be extremely accurately related to the r.p.m. of said rollers 16 or 19, that is to say the number of turns for the common drive shaft 20 or 21.

Therefore, according to the embodiment of the invention as above shown, the yarn measuring apparatus substantially comprises a reference pulse generating device 25 such as, for example, a photoelectric, magnetic, mechanical or pneumatic transducer or the like, depending on the nature of the signal to be generated, the device converting the rotation of shaft 20 or 21 to a succession of reference pulses, the frequency of which is proportional to the speed of rotation of said drive shaft 20 or 21.

As generally outlined, this generator 25 generates a predetermined number n of pulses in yarn length unit depending on the ratio of said length unit and the circumference length of rollers 16 or 19.

The reference pulse generator 25 is connected to the input to a preset frequency divider 26, which is common to all of the several working stations and at the output generates a sequence of count pulses, the period of which in accordance with the foregoing is proportional to the yarn length to be measured and which is preset by rotary change-over switches, in this case outlined as embodied in said block 26.

At the same time, the output of the frequency divider 26 is supplied to the count units 28 for each of the spinning units 10 or working stations of the textile machine.

In addition to the actual counter 27, each of the count units 28 comprise a device 27' for shutting off the count pulse supply, a signalling device for count completion, such as a lamp 34, and a manual control 27'' for resetting or restoring said counter 27.

Each of the counting units 28 are adapted to count a predetermined number of count pulses which, as previously discussed, is constant and independent of the yarn length to be measured as set on the frequency converter device 26. At the end of each count period, each of said count units will supply at the output a control signal operating a yarn shutoff device. In the particular case of the open end spinning machine shown in FIG. 2, the yarn shutoff can be effected by shutting off the fiber supply to the spinning unit 10.

In the example shown, each of said count units 28 control the supply circuit, for example, for the coil 29 of an electromagnetic clutch 30 keyed on the drive shaft of the feeding device 13 of the sliver 12, thus shutting off the fiber supply and yarn production. For each of the working stations there is also provided a yarn sensor device 31' sensing the absence of said yarn, this sensor 31' being operatively connected, as shown at 31, with the count interrupting device 27' at that working station. Generally, as shown at 32, in an open end spinning machine the spinning unit is already provided with a yarn sensor 31' operatively connected with the fiber feeding device 13 to shut the same off whenever a breakage in yarn 24 occurs. Therefore, according to the invention, said yarn sensor 31' existing on the spinning unit can also be used to control the count interrupting device 27'.

A signalling device 33, such as a lamp or other optical signalling device controlled by the yarn sensor 31', will inform the operator about the yarn breakage.

As above mentioned, a second signalling device 34, such as a lamp or other device suitable to the purpose, is energized by the output signal from the count unit 28 associated with that spinning unit.

Referring now to the exemplary diagram of FIG. 3, another application of the apparatus according to the invention will be described. By way of example, FIG. 3 shows a single working station of a spooler substantially comprising a drive shaft 35, suitably rotably driven and carrying rollers 36 (only one of which shown in the figure) for distributing and winding up the yarn 37 from a cop 38 on a bobbin 39 rotably carried on an axis 40.

Also in this case, the shaft 35 is connected to a reference pulse generator 25 (the same reference numerals are used for the parts common to the example of FIG. 1), this generator supplying its signals to the frequency divider 26.

Similarly to the above example, the output of said divider 26 is simultaneously supplied to all of the count units 28 associated with the several working stations. A yarn sensor 31' is similarly connected through an operative connection 31 with the count pulse interrupting device 27' for a working station. A first signalling device 33 will inform the operator about a yarn breakage due to casual or technological reasons, and a second signalling device 34 will inform that the desired yarn amount has been wound up on the bobbin and that both count and yarn shutoff has occurred. Unlike the preceding case, in the case of FIG. 3 the output of each local count unit 28 is supplied to a yarn cutting device 41. Should the spooler be provided with an electronic slub-catcher, the latter can also perform the task of the above mentioned yarn sensor 31'; in this case, the cutting device 41 is conventionally connected through a second operative connection 42 with said electronic slub-catcher 31' to allow for removing those yarn sections not having the required technological characteristics.

The operation of the apparatus according to the inventive process is substantially similar to that described for the apparatus of FIG. 1. Referring to FIG. 2 and in the case of an open end spinning machine, the yarn 24 is continuously produced at each of the spinning units 10 supplied with the open state fibers from the fiber sliver 12, and this yarn 24 is withdrawn by the rollers 16 and 17 and wound up on the bobbin 18 through the cylinder 19. However, and from the foregoing, at each turn or rotation of the withdrawing roller 16, that is to say at each turn of the drive shaft 20, the generator 25 will emit a sequence of reference pulses which are supplied to the frequency divider 26. This divider 26, on which the yarn length to be measured has been set, will process the input reference pulses emitting count pulses at a rate which is proportional to the set yarn length. These count pulses outputting from the frequency divider are supplied to the individual count units 28, the latter outputting a control signal whenever the predetermined pulse number has been counted. The control signal thus generated is used for operating the device providing for shutting off the fiber supply, in this case for example the electromagnetic clutch 30. At the same time, the count is shut-off at the count unit 28 associated with the spinning unit. Otherwise, in the case of FIG. 3, the output signal from unit 28 controls the cutting device 41 providing for yarn cutting. In the case of casual or technological breakage of the yarn, the sensor device 31' operates to supply a control signal through the operative connection 31 to the device 27', with the latter shutting off the count of said device 28. Once the yarn breakage has been repaired, the count will be restored starting from where it had been interrupted, and the yarn measuring therewith. At the same time, the other working stations of the machine will have continued to operate without being upset or effected by the ups and downs of the working station(s) where a yarn breakage has occurred.

When the desired amount of yarn has been wound up on the bobbin, the signalling devices 33 and 34 on the spinning unit are activated, thus signalling the operator that the yarn is interrupted and the measurement completed. Therefore, the operator has to provide for replacing the filled bobbin with an empty one. By operating on the manual restore control 27'', the local count unit 28 is reset to initiate a new measuring cycle.

Referring now to FIG. 4, an electronic embodiment for the apparatus according to the invention will be described.

As shown in FIG. 4, the reference pulse generator, designated at 25 in the preceding figures, substantially comprises a gear wheel 45 which is mechanically connected to the single machine drive shaft 20 or 35, and an electromagnetic sensor device 46, the output signals of which are supplied to an amplifier 47 providing for amplifying and in turn supplying such signals through a line separator 48 to a monostable circuit 49 imparting the desired shape and amplitude to each pulse thus generated. The output of circuit 49 is connected through a first and second dividing circuits 50 and 51, respectively, to the frequency dividing circuit 26, on which the yarn length to be measured is set.

In the example shown, said circuit if formed of the count circuits 52, 53, 54 and 55 respectively corresponding to the units, tens, hundreds and thousands for the preselected base unit, comparators 56, 57, 58 and 59 and associated rotary change-over switches or setting devices 60, 61, 62 and 63.

Each of the count circuits and associated rotary change-over switches, on which the number of unit preselected for each order of magnitude is manually set, are connected to the associated comparator.

The several comparators 56, 57, 58 and 59 are cascade interconnected and the output of the last comparator 59 is connected to a restoring circuit 64 for the count circuits 52–55 and to a monostable circuit 65.

The output of the monostable circuit 65 is supplied to the several peripheral count units 28 associated with the working stations, such as the spinning units 10 shown in the schematic view of FIG. 2.

In the example shown in FIG. 4, each of the count units 28 comprise an amplifier 66 which in this case is also used for performing a function similar to the supply shutting off device 27' for the count signals, which amplifier 66 is connected through a first dividing circuit, such as a bistable circuit 67, to further dividing circuits 68 and 69, these dividing circuits 67, 68 and 69 defining the actual count unit designated at 27 in the examples of FIGS. 2 and 3. The last mentioned circuit 69 is connected to a further bistable circuit 70 supplying the base of a transistor 71, or to the control terminal of a corresponding switch device.

Said transistor 71 is connected through a lead 72 to a first control or supply circuit for the yarn interrupting device of the textile machine, such as the electromagnetic clutch 30, while a second supply circuit can be completed through the contact 74 of the above mentioned yarn sensing device. A second by-passed branch 75 is for completing through said transistor 71 a signalling device, such as the electric lamp 34 lighting upon count completion and indicating that the completion of the measurement for the preselected yarn length has been effected at that working station. A second signalling device, such as the lamp 33, is supplied by the closing of said contact 74 of the above mentioned yarn sensor to indicate a casual yarn breakage condition when the count has not been yet completed.

Between the amplifier 66 of the counter 28 and the lead 72 completing both the supply circuit for the electromagnetic clutch 30 through the transistor 71, and the circuit of the signalling lamp 34 through the contact 74 of the yarn sensor, a connection 78 is branched off, as substantially corresponding to the operative connection designated at 31 in FIGS. 1 and 2, between the yarn sensor 31' and the count shutting off device 27'.

A manually operable pushbutton 79, performing the same function as the control device 27'' of FIG. 1 or 2, enables to reset the counter device 28 for a next count operation.

It will be appreciated that the foregoing as shown with reference to FIG. 4, was given by mere way of example, and that other approaches could be adopted instead of that described without departing from the inventive approach as shown in the figures of the accompanying drawings. For example, the various counter devices 28 associated with the various working stations, as well as the central unit 26, could be replaced by other equivalent devices of mechanical or pneumatic or mixed nature, depending on the nature of the signals being generated.

However, the several constructive embodiments should have in common the principle as above disclosed and shown with reference to FIG. 1 and constituting the basic approach concept of the invention.

What is claimed is:

1. A method for yarn length measuring in textile machines having a plurality of working stations driven by a single shaft, comprising the steps of cyclically generating references pulses for the rotations or turns of said shaft, converting said reference pulses to count pulses with a frequency ratio presettable in accordance with the ratio of yarn length to be measured and a fixed count capability, simultaneously supplying said count pulses to the plurality of working stations and effecting independently at each of said stations a count of a same number of pulses as said fixed count capability.

2. A method as set forth in claim 1, further comprising the step of generating upon count completion a signal suitable to control the yarn continuity interruption or shutoff.

3. A method as set forth in claim 1, further comprising the steps of continuously sensing the presence of the yarn to be measured and, in the case of yarn breakage, shutting off the count of said count pulses, resuming it after the yarn breakage has been repaired starting from the interruption point thereof.

4. A method for yarn length measuring for a winding machine or any similar textile machine according to the rotations or turns of a shaft proportional to said yarn length, comprising the steps of cyclically generating references pulses for the rotations or turns of said shaft, converting said reference pulses to count pulses with a frequency ratio presettable in accordance with the ratio of the yarn length to be measured and a fixed count capability, simultaneously supplying said count pulses to the plurality of working stations and effecting, independently at each of said stations the count for a same number of count pulses as said capability, and interrupting the yarn upon the completion of said count by generating a control signal for a yarn cutting device.

5. A method for yarn length measuring in open end spinning machines having a plurality of working stations driven by a single shaft, comprising the steps of cyclically generating reference pulses for the rotations or turns of said shaft, converting said reference pulses to count pulses with a frequency ratio presettable in accordance with the ratio of yarn length to be measured and a fixed count capability, simultaneously supplying said count pulses to the plurality of working stations and effecting independently at each of said stations a count of a same number of pulses as said fixed count capability, interrupting the yarn upon the completion of said count, and generating a control signal for a yarn cutting device.

6. A method for yarn length measuring according to the rotations or turns of a shaft proportional to said yarn length, for an open end type of ringless spinning machine, wherein open state fibers are fed to a plurality of spinning units, and wherein the open state fibers are twisted as yarn which is removed from a respective spinning unit and wound up on a respective bobbin comprising the steps of providing a count unit of a fixed count capability associated with each spinning unit, cyclically generating reference pulses for the rotations or turns of said shaft, converting said reference pulses to count pulses with a frequency ratio presettable in accordance with the ratio of the yarn length to be measured and said fixed count capability, simultaneously supplying said count pulses to said count units and effecting, independently at each of said spinning units, a count for a same number of count pulses as said capability, generating upon count completion at a count unit a signal suitable to control the yarn continuity interruption or shutoff at the associated spinning unit, and interrupting the spinning operation connected with the associated spinning unit upon the completion of the count for said count pulses, stopping the fiber feeding to the spinning unit.

7. A method for yarn length measuring in open end spinning machines having a plurality of working stations each having a yarn extraction roller driven by a single shaft, comprising the steps of cyclically generating reference pulses for the rotations or turns of said yarn extraction rollers, converting said reference pulses to count pulses with a frequency ratio presettable in accordance with the ratio of yarn length to be measured and a fixed count capability, simultaneously supplying said count pulses to the plurality of working stations and effecting independently at each of said stations a count of a same number of pulses as said fixed count capability.

8. An apparatus for yarn length measuring in textile machines, according to the turns of a shaft proportional to the yarn length to be measured, comprising a pulse generator connected to said shaft, a processing unit for the generated pulses, provided with a frequency ratio setting device for outputting count pulses according to a set ratio, and at least one count unit having a fixed count capability and supplied by said count pulses.

9. An apparatus for yarn length measuring in textile machines, according to the turns of a shaft proportional to the yarn length to be measured, comprising a reference pulse generator operatively connected to said shaft, a preset frequency dividing device having its input connected to said pulse generator, said frequency dividing device having a frequency ratio setting device for outputting count pulses according to a set ratio, a plurality of count units each having a fixed count capability, and each connected through a pulse shutoff device to the output of said frequency divider, and thereby simultaneously supplied by said count pulses, the output of said each count unit being operatively connected to an associated yarn interrupting device, and an operative connection being provided between a yarn interrupting device and the associated count pulse shutoff device.

10. An apparatus for yarn length measuring in textile machines having a plurality of working stations provided with a common drive shaft, according to the turns of a shaft proportional to the yarn length to be measured, comprising a reference pulse generator connected to said shaft, a preset frequency dividing device common to all of the working stations and connected with said generator and provided with a frequency ratio setting device for outputting count pulses according to a set ratio; a count unit having a fixed count capability for each of the machine working stations connected to the output of said frequency divider through associated count pulse shutting off devices so that the count stations are simultaneously supplied by output of said frequency divider, each of the count units being also connected to a yarn interrupting device, and an operative connection being provided between a yarn sensor at each working station and the associated count signal shutting off device.

11. An apparatus for yarn length measuring in textile machines, according to the turns of a shaft proportional to the yarn length to be measured, comprising a reference pulse generator operatively connected to said shaft, a processing unit for the generated pulses, provided with a frequency ratio setting device for outputting count pulses according to a set ratio, a plurality of count units each having a fixed count capability, and each connected to the output of said processing unit, so that the count units are simultaneously supplied by said count pulses being outputted by said processing unit.

12. An apparatus as set forth in claim 11 including means associated with each count unit for indicating the count end of the count unit.

13. An apparatus as set forth in claim 11 including manual reset control means associated with each count unit.

14. An apparatus as set forth in claim 10 including an operating circuit associated with each yarn interrupting device, and a circuit connected to a signaling device for indicating yarn breakage associated with each working station, a contact operatively connected to each yarn sensor including means for closing the operating circuit and the circuit connected to the signaling device of the respective work station.

15. An apparatus as set forth in claim 10 including an operating circuit associated with each yarn interrupting device, each of said count units comprising an amplifier for the count pulses from said frequency divider, a set of dividing circuits defining a predetermined count capacity, the output of said set of dividing circuits being connected through a bi-stable circuit to the control electrode of a switch connected to the operating circuit associated with the respective yarn interrupting device and a connection for a block control between said operating circuit and said amplifier.

16. An apparatus as set forth in claim 10 wherein said textile machines are of the open-end spinning machine types having fiber supplies associated with the working stations, each count unit being operatively connected to a device for shuting off a fiber supply associated with a respective working station.

17. An apparatus as set forth in claim 10 wherein each count unit is operatively connected to a yarn cutting device associated with a respective work station.

18. An apparatus as set forth in claim 9 including an operating circuit associated with each yarn interrupting device, a circuit connected to a count end signaling device associated with each working station, the output of each count unit being connected to the control terminal of a switch device connected in the operating circuit associated with the respective yarn interrupting device and the circuit connected to the count end signaling device associated with the respective working station.

19. An apparatus as set forth in claim 10 including an operating circuit associated with each yarn interrupting device, a circuit connected to a count end signaling device associated with each working station, the output of each count unit being connected to the control terminal of a switch device connected in the operating circuit associated with the respective yarn interrupting device and the circuit connected to the count end signaling device associated with the respective working station.

* * * * *